United States Patent [19]

McMahan

[11] 4,415,956
[45] Nov. 15, 1983

[54] RETAINER MEMBER FOR A VEHICLE HEADLAMP

[75] Inventor: David R. McMahan, Anderson, Ind.

[73] Assignee: General Motors Corporation, Detroit, Mich.

[21] Appl. No.: 450,659

[22] Filed: Dec. 17, 1982

[51] Int. Cl.³ .............................................. F21V 21/26
[52] U.S. Cl. .................................... 362/269; 362/275; 362/285; 362/288; 362/289; 362/362; 362/368; 362/374; 362/375; 362/396
[58] Field of Search ............... 362/269, 285, 288, 289, 362/275, 362, 368, 374, 375, 396

[56] References Cited

U.S. PATENT DOCUMENTS

| | | | |
|---|---|---|---|
| 4,149,229 | 4/1979 | Draper | 362/349 |
| 4,277,818 | 7/1981 | Urbanek et al. | 362/267 |
| 4,345,307 | 8/1982 | Mayer et al. | 362/369 |

Primary Examiner—Stephen J. Lechert, Jr.
Attorney, Agent, or Firm—Edward J. Biskup

[57] ABSTRACT

A retainer member for maintaining a headlamp within a housing characterized in that one portion of the retainer member is connected to the housing by a pivotal connection and another portion of the retainer member is connected to the housing by a spring clip arrangement that is manually released when it is desired to remove the headlamp from the housing.

3 Claims, 14 Drawing Figures

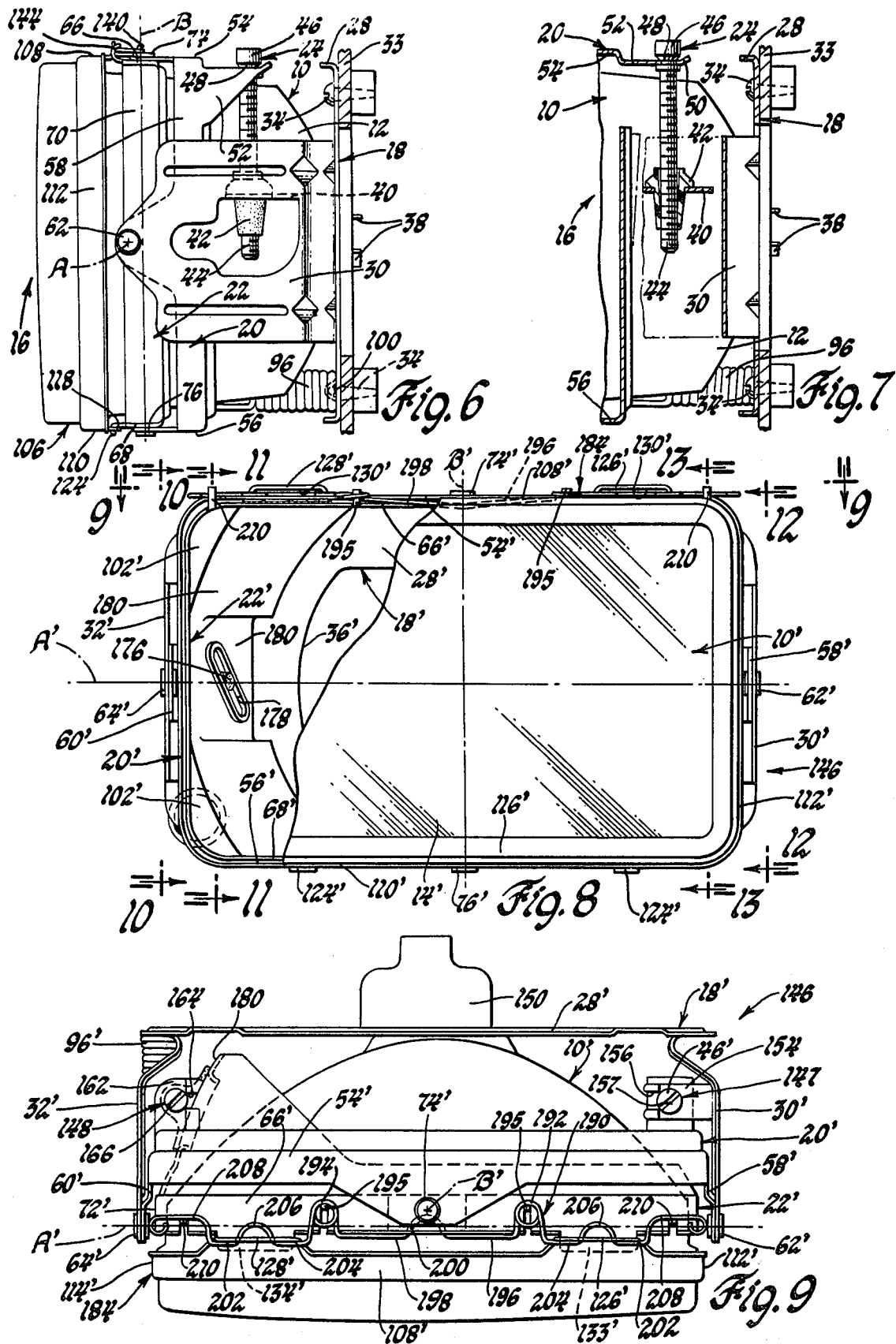

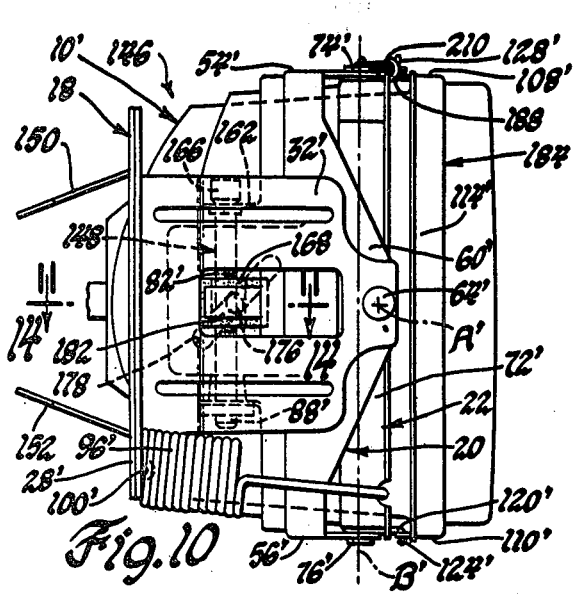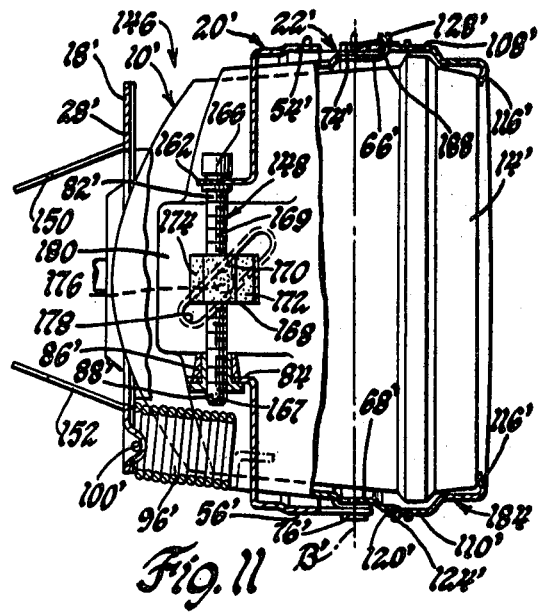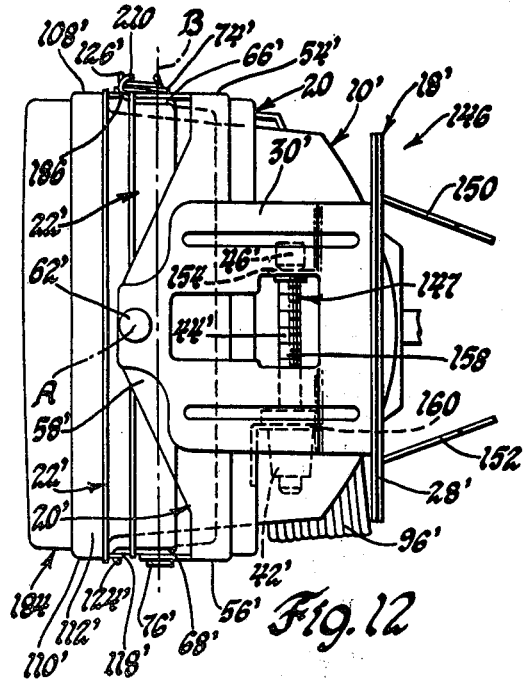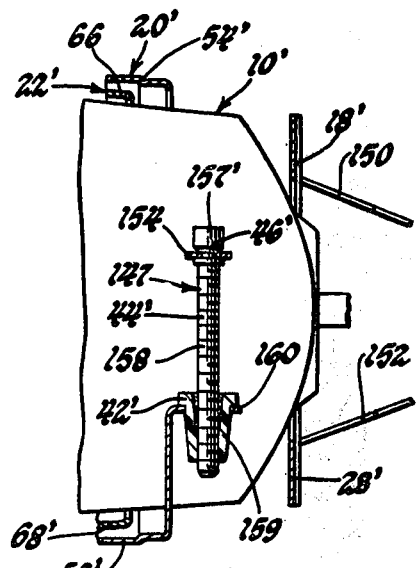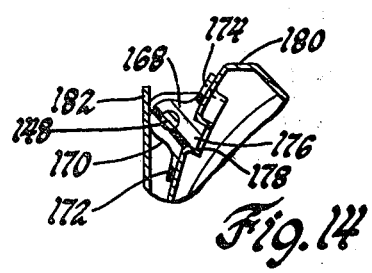

RETAINER MEMBER FOR A VEHICLE HEADLAMP

This invention relates to vehicle headlamps and more particularly pertains to a retainer member for maintaining a headlamp in a support housing located at the front end of a vehicle body.

More specifically, the retainer member according to the present invention includes parallel and vertically spaced top and bottom wall sections which connect with a pair of parallel and horizontally spaced side wall sections to form a rectangular frame for surrounding a rectangular headlamp. Each of the wall sections is integrally formed with a radially inwardly extending rim which is inclined towards the rear of the headlamp support housing. The rim is adapted to contact the frontal portion of the lens of the headlamp and serves as a spring for biasing the headlamp firmly in contact with the support housing. In the preferred form, the bottom wall section of the retainer member is formed with a pair of ears each of which has an aperture therein that receives a hook rigidly formed on the bottom wall section of the support housing for connecting the bottom wall section to the support housing. In addition, a pair of upwardly extending flanges are formed on the top wall section of the retainer member and each flange has an elongated horizontal slot therein. The slot in each flange cooperates with a spring clip member carried by the support housing and having opposed legs extending from a loop section for connecting the top wall section to the support housing. When it is necessary to remove the headlamp from the support housing, the legs of each spring clip member are initially manually bent rearwardly and raised upwardly to disengage the legs from a pair of hooks on the support housing after which the legs are pressed together to permit the slot of the associated flange to clear the legs and thereby allow the retainer member to be pivoted away from the support housing about an axis extending through the ears of the bottom wall section. Afterwards the ears of the bottom wall section can be released from engagement with the cooperating hooks on the support housing and the retainer member can be removed to allow replacement of the headlamp.

The objects of the present invention are to provide a new and improved retainer member for securely maintaining a headlamp within a housing and that can be readily attached and removed from the housing without requiring any tools; to provide a new and improved retainer member for maintaining a headlamp within a housing and characterized in that one portion of the retainer member is connected to the housing by a pivotal connection and another portion of the retainer member is connected to the housing by a spring clip arrangement that is manually released when it is desired to remove the headlamp from the housing; to provide a new and improved retainer member for supporting a rectangular headlamp within a housing characterized in that the retainer member has at least a pair of opposed wall sections formed with radially inwardly extending rims which are located in a pair of converging planes which intersect in an area located to the rear of the lens of the headlamp; and, to provide a new and improved retainer member for securing a rectangular headlamp within a housing and that includes means for pivotally connecting one side wall section of the retainer member to the housing and has means formed with another wall section that cooperates with a spring clip for removably attaching the retainer member to the housing.

These and other objects and advantages of the invention will be apparent from the following detailed description taken in conjunction with the accompanying drawings, in which:

FIG. 6 is an elevational view taken on line 6—6 of FIG. 1 showing the other side of the support housing and the retainer member;

FIG. 7 is a fragmentary sectional view taken on line 7—7 of FIG. 1 showing the other adjustment screw incorporated in the support housing;

FIG. 8 is a front elevational view of a rectangular headlamp mounted in a modified version of the support housing shown in FIGS. 1 through 7 and maintained in the support housing by a retainer member having a different spring clip member;

FIG. 9 is a plan view on line 9—9 of FIG. 8 showing the top portion of the modified support housing and the spring clip member connecting the retainer member thereto;

FIG. 10 is an elevational view taken on line 10—10 of FIG. 8 showing one of the two sides of the modified support housing;

FIG. 11 is a sectional view taken on line 11—11 of FIG. 8 showing one of the two adjustment screws incorporated in the modified support housing for adjusting the positioning of the headlamp;

FIG. 12 is an elevational view taken on line 12—12 of FIG. 8 showing the other side of the modified support housing;

FIG. 13 is a fragmentary sectional view taken on line 13—13 of FIG. 8 showing the other adjustment screw incorporated in the modified support housing; and FIG. 14 is a fragmentary sectional view taken on line 14—14 of FIG. 10.

Figure 1:
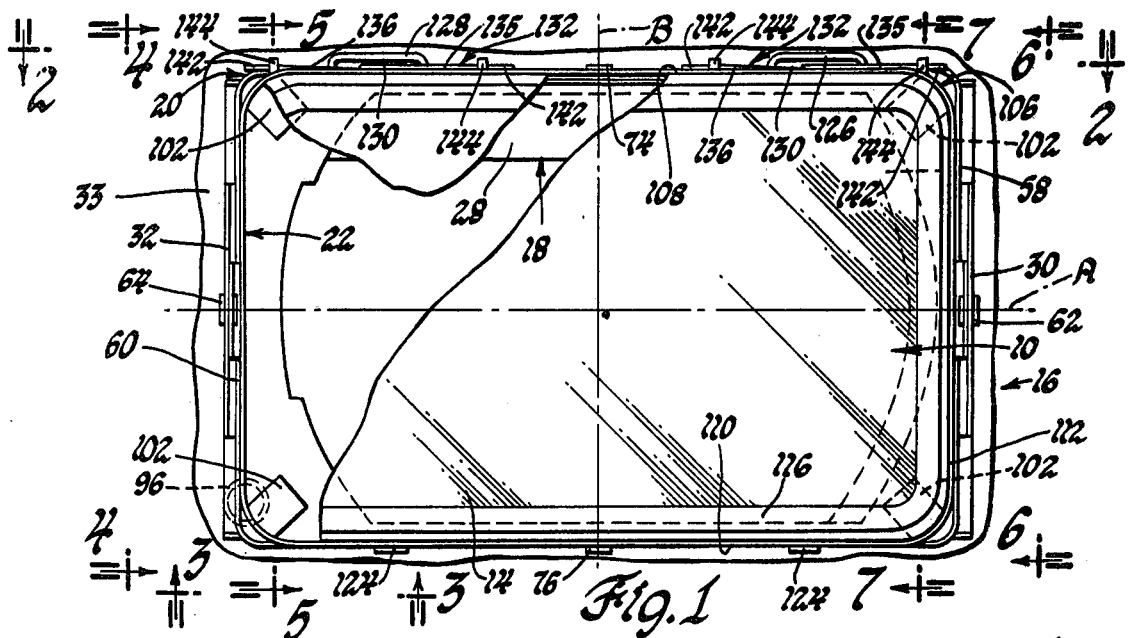
FIG. 1 is a front elevational view of a support housing incorporating a retainer member made in accordance with the present invention for maintaining a rectangular headlamp within the support housing.
Figures 2, 3:
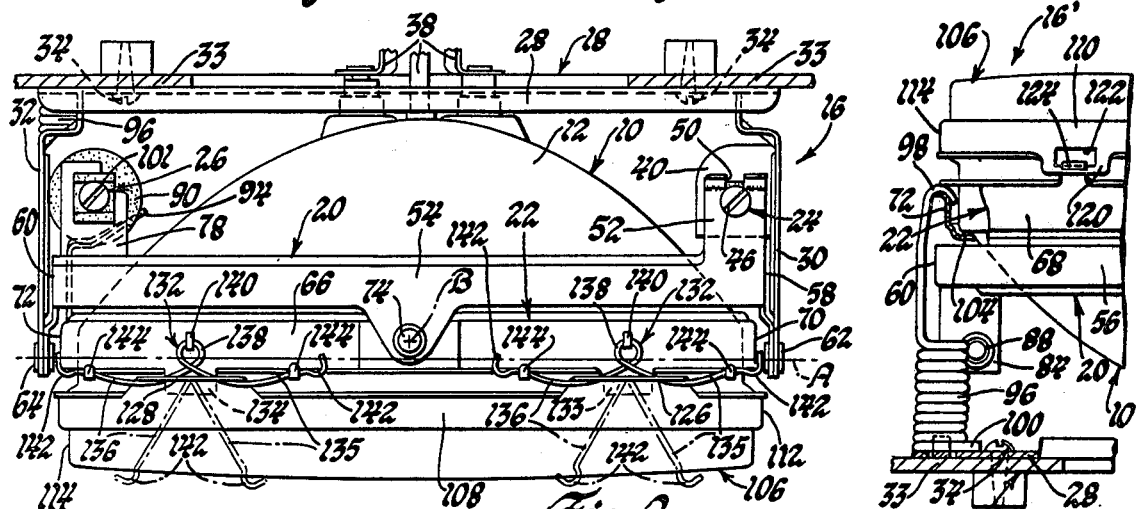
FIG. 2 is a plan view of the upper portion of the support housing and the retainer member taken on line 2—2 of FIG. 1.
FIG. 3 is a fragmentary plan view of the lower portion of the support housing and the retainer member taken on line 3—3 of FIG. 1.

Referring now to the drawings and more particularly to FIGS. 1 through 4, a conventional rectangular vehicle headlamp 10, comprising a reflector 12 and lens 14, is shown partially broken away and mounted within a support housing 16. In general, the support housing 16 includes a bracket member 18, a pair of pivotally interconnected rectangular ring members 20 and 22, and a pair of vertically oriented adjustment screws 24 and 26 which provide aiming adjustment of the headlamp 10 about a horizontal pivot axis identified by the letter A and a vertical pivot axis identified by the letter B in FIGS. 2 and 4. Each of the adjustment screws 24 and 26 is accessible from above the support housing 16 and is located to the rear of the headlamp lens 14 but within the peripheral confines thereof as seen in FIGS. 1 and 2.

More specifically, the bracket member 18 comprises a vertically oriented mounting portion 28 integrally formed with a pair of horizontally projecting arms 30 and 32. The mounting portion 28 is rigidly attached to the body 33 of the vehicle by a plurality of threaded fasteners 34, and is formed with an enlarged aperture 36 (FIG. 5) through which the terminal members 38 of the headlamp 10 extend for connection with the usual connector (not shown) which forms a part of the vehicle wiring harness. As seen in FIGS. 2, 6, and 7, the arm 30 of the bracket member 18 is integrally formed with an inwardly directed tongue 40 which supports a tapered nut 42. The lower end of nut 42 threadably received the lower threaded end 44 of the adjustment screw 24, the slotted head-end 46 of which is formed with a reduced neck portion 48 which, in this case, is located in a U-slot 50 formed in a rearwardly projecting flange 52. For reasons to be explained hereinafter, the U-slot 50 in the flange 52 allows the adjustment screw 24 to be rotated about its longitudinal center axis but prevents axial movement of the adjustment screw 24 relative to the flange 52.

As seen in FIGS. 1-4, the ring member 20 is located between the arms 30 and 32 of the bracket member 18, and is formed as a sheet metal stamping of generally rectangular configuration. The ring member 20 comprises parallel and vertically spaced top and bottom wall members 54 and 56 connected to a pair of horizontally spaced side wall members 58 and 60. As seen in FIG. 2, the aforementioned flange 52 is integrally formed with the top wall members 54 of ring member 20, while the side wall members 58 and 60 are respectively connected to the arms 30 and 32 of the bracket member 18 by the horizontally aligned pivotal connections 62 and 64 which permit the ring member 20 to pivot about the horizontal pivot axis A relative to the fixed bracket member 18 when the adjustment screw 24 is threaded into or out of the nut 42.

Figure 4:
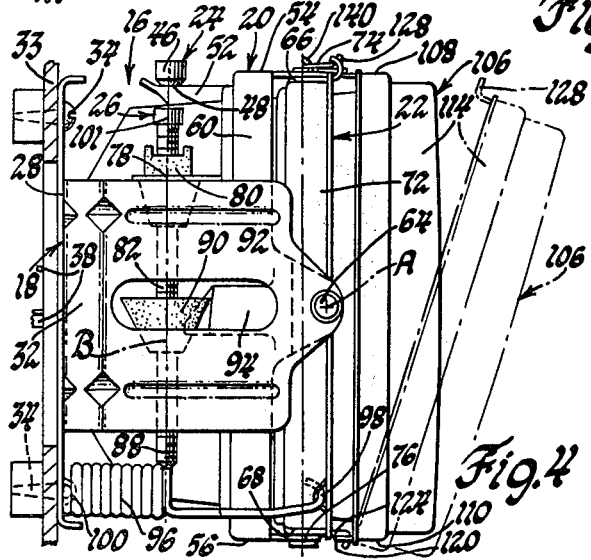
FIG. 4 is a side elevational view taken on line 4—4 of FIG. 1 showing one side of the support housing and the retainer member.
Figure 5:
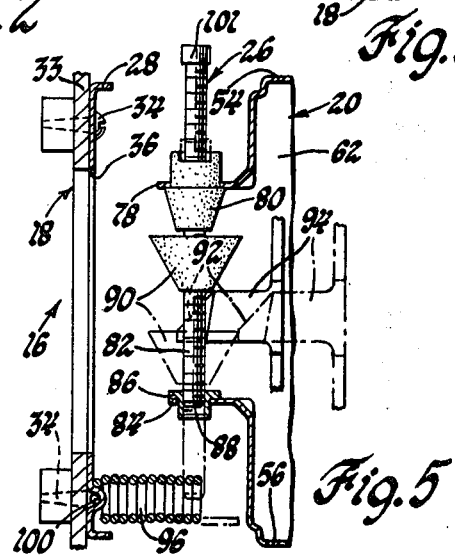
FIG. 5 is a fragmentary sectional view taken on line 5—5 of FIG. 1 showing one of the two adjustment screws incorporated in the support housing.

Similarly, the ring member 22 is a sheet metal stamping generally of rectangular configuration, and of slightly smaller size than ring member 20 so as to allow ring member 22 to be located within and in close proximity to ring member 20. The ring member 22 comprises parallel vertically spaced top and bottom wall members 66 and 68 connected to a pair of horizontally spaced side wall members 70 and 72. The top and bottom wall members 66 and 68 of ring member 22 are connected to corresponding top and bottom wall members 54 and 56 of ring member 20 by vertically aligned pivotal connections 74 and 76 which allow the ring member 22 to pivot about the vertical axis B relative to ring member 20, under the control of the adjustment screw 26 carried by the ring member 20. In this regard—and as seen in FIGS. 4 and 5, the side wall member 60 of ring member 20 is integrally formed with a rearwardly projecting flange 78 rigidly supporting a nut 80 which threadably receives the threaded shank portion 82 of the adjustment screw 26. A similar flange 84 is located directly below flange 78 and is integrally formed with the side wall member 60 of ring member 20. A bushing 86 for guiding the lower end 88 of the adjustment screw 26 is fixed to the flange 84. The intermediate portion of the shank portion 82 of adjustment screw 26 has a conical cam member 90 secured thereto and adapted to engage a ramp 92 formed on a follower member 94 integrally formed with the side wall member 72 of the ring member 22. The ramp 92 is maintained in engagement with the cam member 90 by a coil spring 96—one end 98 of which is connected to the lower end of the side wall member 72 of ring member 22, while the other end 100 of the spring 96 is connected to the mounting portion 28 of the bracket member 18. Thus, by rotating the slotted head-end 101 of the adjustment screw 26 in one direction, the cam member 90 can be moved vertically from the full-line position to the phantom line position shown in FIG. 3, causing the follower member 94 to move horizontally outwardly from the full-line position to the phantom line position and, accordingly, the ring member 22 is positioned about the vertical pivot axis B which passes through the centers of pivotal connections 74 and 76.

The headlamp 10 is carried by the ring member 22 and it will be noted that, as seen in FIG. 1, each corner of ring member 22 is integrally formed with a radially inwardly extending locator portion having a vertically oriented planar surface 102 against which one of the four corner seating pads 104 (FIG. 3) formed on the rear of the reflector 12 is seated for properly locating the headlamp 10 relative to the ring member 22. A retainer member 106, in the form of a rectangular frame, surrounds the lens 14 of headlamp 10 and serves to maintain the headlamp 10 securely within the ring member 22 by applying a rearwardly directed force to the frontal portion of the lens 14 so as to cause the seating pads 104 of the headlamp 10 to be firmly in contact with the surfaces 102 of the locator portions formed on the ring member 22. The retainer member 106 includes parallel and vertically spaced top and bottom wall sections 108 and 110 which connect with a pair of parallel and horizontally spaced side wall sections 112 and 114. Each of the top and bottom wall sections 108 and 110 and each of the side wall sections 112 and 114 is integrally formed with a radially inwardly extending rim 116 which, in this instance, is inclined towards the rear of the support housing 16. The rim 116 formed with each wall section contacts the frontal portion of the lens 14 and functions as a spring to bias the seating pads 104 of the headlamp 10 firmly in control with the surfaces 102 of the ring member 22. As seen in FIGS. 3, 4, and 6, the bottom wall section 110 of the retainer member 106 is formed with a pair of identical ears 118 and 120 which are spaced an equal distance from the side wall sections 112 and 114, respectively. Each ear 118 and 120 has an aperture 122 formed therein that receives a hook 124 rigidly formed with the bottom wall member 68 of the ring member 22. In this manner, the bottom wall section 110 of the retainer member 106 is connected to the ring member 22.

As seen in FIGS. 1 and 2, a pair of horizontally spaced and upwardly extending flanges 126 and 128 are formed with the top wall section 108 of the retainer member 106. Each of the flanges 126 and 128 has an elongated horizontal slot 130 (FIG. 1) formed therein and cooperates with a spring clip member 132 for connecting the top wall section 108 of the retainer member 106 to the ring member 22. It will be noted that the flanges 126 and 128 are respectively seated on lips 133 and 134 extending forwardly from the top wall member 66 of the ring member 22. The seating of the flanges 126 and 128 on the lips 133 and 134 helps to confine the retainer member 106 in the vertical direction. It will also be noted that each spring clip member 132 includes a pair of legs 135 and 136 connected to a loop section 138 which is held by a hook 140 rigidly formed on the top wall member 66 of the ring member 22. The legs 135 and 136 extend through the slot 130 of the associated flange 126, 128, formed on the retainer member 106 and each leg 135, 136 terminates with a tang 142. As seen in FIG. 2, each leg 135 and 136 is bent rearwardly and engages a hook 144 rigidly formed with the front edge of the ring member 22.

Thus when it is necessary to remove the headlamp 10 from the ring member 22, the tangs 142 of each spring clip member 132 are initially manually bent rearwardly to disengage the legs 135 and 136 from the hooks 144 after which the legs 135 and 136 are raised upwardly to clear the hooks 144 and permitted to assume an unflexed position shown in phantom lines in FIG. 2. The tangs 142 of each spring clip member 132 are then manually pressed together and the top wall section 108 of the retainer member 106 is pivoted, as seen in phantom lines in FIG. 4, about the hooks 124 of ring member 22 permitting the slot 130 of each flange 126 and 128 to clear the raised legs 135 and 136 of the associated spring clip member 132. The ears 118 and 120 are then released from engagement with the hooks 124 and the retainer member 106 is removed from the support housing 16.

As should be apparent, the procedure set forth above for removing the retainer member 106 is reversed when it is desired to mount a headlamp in the support housing 16.

As should be apparent from the above description, when it is desired to aim the headlamp 10 about the horizontal pivot axis A, a screwdriver is used to rotate the adjustment screw 24 in a clockwise or counterclockwise direction, as seen in FIG. 2. If rotated in a clockwise direction, the adjustment screw 24 will move axially into the nut 42 and simultaneously the head-end 46 will tilt rearwardly as seen in FIG. 6, causing the flange 52 to be drawn towards the mounting portion 28. As a result, the ring members 20 and 22 together with the headlamp 10 pivot as a unit in a clockwise direction about the horizontal pivot axis A. The nut 42, as seen in FIG. 7, has the lower portion thereof only formed with threads which engage the threads of the adjustment screw 24. Accordingly, the adjustment screw 24 when screwed into the nut 42 will tilt rearwardly, as aforementioned. Conversely, when the adjustment screw 24 is rotated counterclockwise, as seen in FIG. 2, so as to cause the adjustment screw 24 to be moved axially out of the nut 42, the lower portion of the adjustment screw 24 will pivot about the nut 42 and the head-end 36 will tilt forwardly so as to cause the flange 52 to be moved away from the mounting portion 28 with resultant counterclockwise movement of the ring members 20 and 22 and the headlamp 10 about the horizontal pivot axis A as seen in FIG. 6.

Aiming of the headlamp 10 about the vertical pivot axis B is effected by clockwise or counterclockwise rotation of the adjustment screw 26 as seen in FIGS. 2 and 4. Thus, when the adjustment screw 26 is rotated clockwise, as seen in FIG. 2, the screw 26 will move axially downwardly into the nut 80 under the guiding control of the bushing 86. The downward movement of the screw 26 causes corresponding movement of the cam member 90 which results in outward movement of the follower member 94 against the bias of the coil spring 96. Inasmuch as the follower member 94 is integral with the side wall member 72 of ring member 22, the ring member 22 and the supported headlamp 10 are, accordingly, pivoted in a counterclockwise direction about the vertical pivot axis B as seen in FIG. 2. Conversely, rotation of the adjustment screw 26 in a counterclockwise direction, as seen in FIGS. 2 and 4, causes the adjustment screw 26 and the attached cam member 90 to be moved axially upwardly relative to the follower member 94. As a result, the bias of spring 96 causes the follower member 94 and the integrally formed side wall member 72 to move toward the mounting portion 28 so that the ring member 22 and the headlamp 10 pivot in a clockwise direction about the vertical pivot axis B as seen in FIG. 2.

It will be noted that the full line and phantom line positions of the cam member 90 and the follower member 94 as seen in FIG. 5, are the extreme positions assumed by these members during the rotation of the adjustment screw 26.

FIGS. 8 through 14 of the drawings show a support housing 146 which is a modified form of the support housing 16 shown in FIGS. 1 through 7. Basically, the difference between the support housing 146 and the support housing 16 is in the type of adjustment screw arrangement provided for moving the headlamp about the horizontal and vertical pivot axes and also in the type of the spring clip used for securing the retainer member to the support housing for mounting the headlamp therein. Therefore, inasmuch as the support housing 146 is essentially the same in construction and function as the support housing 16, the parts of the support housing 146 corresponding to the parts of the support housing 16 are identified by the same reference numerals but primed.

Referring now to FIGS. 8 and 9, it can be seen that as in the case of support housing 16 the support housing 146 includes a bracket member 18' and a pair of rectangular ring members 20' and 22' which are pivotally interconnected so as to provide aiming adjustment of the rectangular headlamp 10' about a horizontal pivot axis A' and a vertical pivot axis B'. In this case, adjustment of the headlamp 10' about the horizontal pivot axis A' and the vertical pivot axis B' is achieved by manual rotation of a pair of vertically oriented adjustment screws 147 and 148 located within the peripheral confines of the lens 14' as seen in FIG. 8 and accessible from the top of the support housing 146.

As best seen in FIGS. 9 and 10, the bracket member 18' includes a vertically oriented mounting portion 28' rigidly formed with rearwardly projecting headlamp terminal guard members 150 and 152 and a pair of parallel and horizontally forwardly projecting arms 30' and 32'. Although not shown, the mounting portion 28' of the bracket member 18' has apertures formed therein which allow the bracket member 18' to be secured to a vehicle body in the manner of support housing 16. Also, the mounting portion 28' includes an enlarged centrally located aperture 36' permitting the terminals (not shown) of headlamp 10' to extend rearwardly beyond the mounting portion 28' for electrical connection with the usual connector carried by the vehicle wiring harness.

The ring members 20' and 22' are located between the arms 30' and 32' of the bracket member 18' and, as seen in FIGS. 8, 9, 10, and 12, the side wall members 58' and 60' of the ring member 20' are connected to the arms 30' and 32', respectively, by horizontally aligned pivotal connections 62' and 64' which allow the ring member 20' to be adjusted about the horizontal pivot axis A'. The top and bottom wall members 66' and 68' of the ring member 22' are located between the top and bottom wall members 54' and 56' of the ring member 20' and are respectively connected thereto by vertically aligned pivotal connections 74' and 76' which allow the ring member 22' to pivot about the vertical pivot axis B' relative to the ring member 20' for aiming the headlamp 10'.

As aforementioned, the adjustment of the headlamp 10' is realized by rotation of the adjustment screws 147 and 148, and in this regard, it will be noted that a flange 154 (FIGS. 9 and 12) fixed to the arm 30' of bracket member 18' has a U-slot 156 formed therein which supports the slotted head-end 157 of the adjustment screw 147 for rotation relative to the flange 154. The threaded shank 158 of the adjustment screw 147 is threadably received by the nut 159 rigidly mounted within a flange 160 located below flange 154 and integrally formed with the side wall member 58' of the ring member 20'. Rotation of the adjustment screw 147 in one direction or the other, causes the threaded shank 158 to be threaded into or out of the nut 159 causing the flange 160 to move upwardly or downwardly and as a result the ring members 20' and 22', and accordingly, the headlamp 10' is adjusted in position about the horizontal pivot axis A' defined by pivotal connections 62' and 64'.

As to the adjustment of the headlamp 10' about the vertical pivot axis B', it will be noted that, as seen in FIGS. 9, 10, 11 and 14, the side wall member 60' of the ring member 20' includes a rearwardly extending flange 162 formed with a U-slot 164 which carries the slotted head-end 166 of adjustment screw 148. The U-slot 164 allows rotation of the adjustment screw 148 about its longitudinal axis but prevents axial movement of the adjustment screw 148 relative to the flange 162. The lower end 167 of the adjustment screw 148 is received by a bushing 86' fixed within the flange 84' which extends rearwardly from and is rigidly connected to the side wall member 60' of the ring member 20'. Intermediate the head-end 166 and the lower end 167 of the adjustment screw 148, a nut 168 is threadably mounted on the threaded shank portion 169 of the adjustment screw 148. As seen in FIG. 14, the nut 168 includes a body portion 170 formed with oppositely extending arms 172 and 174 and has a cylindrical projection or pin 176 which extends into a slot 178 formed in a spherical section 180 which is integral with and extends rearwardly from the side wall section 72' of the ring member 22'.

As best seen in FIGS. 10 and 11, the longitudinal center axis of the slot 178 is inclined at an angle of approximately 45° to an imaginary horizontal plane passing through the horizontal pivot axis A' so that upon rotation of the adjustment screw 148 in one direction or the other, the nut 168 moves upwardly or downwardly along the shank portion 169 of the adjustment screw 148 and causes the projection 176 to move to different positions within the slot 178. As a result, the spherical section 180 and, accordingly, the attached ring member 22' and headlamp 10' are movable about the vertical pivot axis B'. It will also be noted that as seen in FIGS. 10 and 14, a spring arm 182 integrally formed with the side wall member 72' of ring member 22' serves to bias the arms 172 and 174 of the nut 168 into surface contact with the spherical section 180 so as to maintain the cylindrical projection 176 in the slot 178 while the adjustment screw 148 is being rotated.

The retainer member 184 which serves to maintain the headlamp 10' within the ring member 22' of the support housing 146, is structurally similar to the retainer member 106 employed by the support housing 16 in that the retainer member 184 is also rectangular in configuration and includes top and bottom parallel wall sections 108' and 110' and a pair of parallel side wall sections 112' and 114' each formed with a radially inwardly extending rim 116', which, as seen in FIG. 11, is located in a plane inclined towards the rear of the support housing 146. The rim 116', in each instance, contacts the frontal portion of the lens 14' and serves as a spring to bias the headlamp 10' rearwardly into contact with the surfaces 102' of the ring member or when the retainer member 184 is connected to the ring member 22' as shown in FIGS. 8-12. Also, as in the case of the retainer member 106, the bottom wall section 110' of the retainer member 184 is formed with a pair of rearwardly extending apertured ears 118' and 120' while the top wall section 108' includes a pair of flange portions 126' and 128' each of which has a horizontal slot 130' formed therein. Each of the ears 118' and 120' is mounted on a hook 124' integrally formed with the front edge of the bottom wall member 68' of the ring member 22' while the flange portions 126' and 128' seat upon outwardly extending lips 133' and 134' respectively, integrally formed with the front edge of the top wall member 66' of the ring member 22'.

Rather than having separate spring clips as found in support housing 16 for connecting each of the flange portions 126' and 128' to the ring member 22', a unitary spring clip 190 (FIG. 9) made from a single strand of spring wire is provided which includes a pair of identical loop sections 192 and 194 each of which is retained by a hook 195 fixed to the top wall member 66' of the ring member 22'. The loop sections 192 and 194 are interconnected by an intermediate section consisting of a pair of axially aligned straight portions 196 and 198 connected to a U-shaped portion 200 located midway between the loop sections 192 and 194. A leg section is also connected to each of the loop sections 192 and 194 and each leg section consists of a pair of straight portions 202 and 204 which are located in a vertical plane forwardly offset from and parallel to a vertical plane passing through the straight portions 196 and 198 of the intermediate section of the spring clip 190. A U-shaped portion 206, which is substantially the same in size as the U-shaped portion 200, extends through the slot 130' of the associated flange portion and interconnects the straight portions 202 and 204. In addition, each leg section terminates with a straight portion 208 which engages a hook 210 formed on the front edge of the ring member 22' adjacent each side wall member thereof and connects with a straight portion 202. The straight portions 208 are located in a vertical plane rearwardly offset from and parallel to a vertical plane passing through the straight portions 196 and 198.

As seen in FIG. 9, the retainer member 184 can be released from the ring member 22' for removal of headlamp 10' by initially bending the straight portion 208 of each leg section rearwardly towards the mounting portion 28' to disengage each leg section from the hook 210 after which the straight portion 208 is raised upwardly of the top wall member 66' of ring member 22' to clear the hook 210. Each leg section is then bent forwardly to remove the U-shaped portion 206 from the accommodating slot 130' after which the top wall section 108' is tilted about the hooks 124' (FIG. 10) to remove the retainer member 184 from the support housing. It will be noted that after the retainer member 184 is removed from the support housing, the headlamp 10' can be readily replaced with a new headlamp. Also, inasmuch as the U-shaped portion 200 of the intermediate section of the spring clip member 190 is located below the top wall member 66' of the ring member 22' and the loop sections 192 and 194 are located above and rest upon the top wall member 66', the spring clip member 190 is essentially secured to the ring member 22' and retained thereby after the retainer member 184 is removed from the support housing.

Various changes and further modifications can be made in the construction of this retainer member for a headlamp without departing from the spirit of the invention. Such changes and modifications are contemplated by the inventor, and he does not wish to be limited except by the scope of the appended claims.

The embodiments of the invention in which an exclusive property or privilege is claimed are defined as follows:

1. A retainer member for maintaining a headlamp within a support housing formed with locator surfaces, said retainer member including a frame adapted to surround the front peripheral portion of said headlamp, cooperating hook and slot means formed on one portion of said frame and on said support housing for removably connecting said one portion of said frame to said support housing for pivotal movement about an axis substantially perpendicular to the optical axis of said headlamp, cooperating flange and manually operable spring clip means carried by another portion of said frame and by said support housing for locking said retainer member to said support housing when said hook and slot means are interconnected, said frame being formed with a radially inwardly extending rim which is inclined towards the rear of said support housing so when said retainer member is locked to said support housing by said cooperating flange and spring clip means said rim engages the lens of said headlamp and serves as a spring to bias said headlamp inwardly towards said locator surfaces.

2. A retainer member for maintaining a rectangular headlamp within a support housing formed with locator surfaces, said retainer member adapted to surround the front peripheral portion of said headlamp and comprising top and bottom parallel wall sections connected to a pair of parallel side wall sections, cooperating hook and slot means formed on one of said wall sections and on said support housing for removably connecting said one of said wall sections to said support housing, cooperating flange and manually operable spring clip means carried by another of said wall sections and by said support housing for locking said retainer member to said support housing when said hook and slot means are interconnected, at least two of said wall sections located opposite to each other each being formed with a radially inwardly extending rim located in a plane inclined towards the rear of said support housing so when said retainer member is locked to said support housing by said cooperating flange and spring clip means said rim on each of said two of said wall sections engages the lens of said headlamp and serves as a spring to bias said headlamp inwardly towards said locator surfaces.

3. A retainer member for maintaining a rectangular headlamp in a housing located at the front end of a vehicle body, said retainer member including parallel and vertically spaced top and bottom wall sections, a pair of parallel and horizontally spaced side wall sections connected to said top and bottom wall sections so as to form a rectangular frame, each of said wall sections being formed with a radially inwardly extending rim which is inclined towards the rear of said housing for engaging the frontal portion of the lens of said headlamp and biasing the headlamp into firm contact with said housing, hinge means formed on said bottom wall section and adapted to connect said retainer member to said housing for pivotal movement about a horizontal axis, flange means connected to said top wall section and having an elongated horizontal slot formed therein, and a spring clip member carried by said housing and having a pair of legs adapted to extend through said slot and be releasably attached to said housing for locking said retainer member to said housing.

* * * * *